Aug. 4, 1953  G. A. YALE  2,647,433
COMPARATOR FOR ASSISTING IN THE IDENTIFICATION
OF UNKNOWN STAINS, COLORS OR THE LIKE
Filed Aug. 19, 1949  5 Sheets-Sheet 1

INVENTOR
GORDON A. YALE
BY Paul D. Boone
ATTORNEY

Aug. 4, 1953                G. A. YALE                2,647,433
COMPARATOR FOR ASSISTING IN THE IDENTIFICATION
OF UNKNOWN STAINS, COLORS OR THE LIKE
Filed Aug. 19, 1949                                    5 Sheets-Sheet 2

INVENTOR.
GORDON A. YALE
BY
Paul D. Boone
ATTORNEY

Aug. 4, 1953                G. A. YALE                2,647,433
        COMPARATOR FOR ASSISTING IN THE IDENTIFICATION
              OF UNKNOWN STAINS, COLORS OR THE LIKE
Filed Aug. 19, 1949                        5 Sheets-Sheet 3

INVENTOR
GORDON A. YALE
BY
ATTORNEY

Aug. 4, 1953

G. A. YALE

2,647,433

COMPARATOR FOR ASSISTING IN THE IDENTIFICATION
OF UNKNOWN STAINS, COLORS OR THE LIKE

Filed Aug. 19, 1949

INVENTOR.
GORDON A. YALE
BY
Paul D. Boone
ATTORNEY

Patented Aug. 4, 1953

2,647,433

UNITED STATES PATENT OFFICE

2,647,433

COMPARATOR FOR ASSISTING IN THE IDENTIFICATION OF UNKNOWN STAINS, COLORS, OR THE LIKE

Gordon A. Yale, Marblehead, Mass.

Application August 19, 1949, Serial No. 111,262

17 Claims. (Cl. 88—14)

This invention relates to a comparator which is designed to assist in the identification of unknown stains, colors, pigments, paints, and the like, which are either themselves solid in composition or carried upon a solid background, such as fabrics. It is particularly adapted to assist in the rapid and convenient identification of unknown stains on garments, slipcovers, drapes, and other textile articles.

In dry cleaning establishments, where thousands of garments are handled daily, it is of the utmost importance to be able to rapidly and accurately identify the origin of a particular stain or spot. For each type of stain there is a proper removal procedure. If the stain is incorrectly treated, the stain may be permanently set instead of removed, irreparably damaging the garment. While it is often possible for the experienced cleaner to identify the type of stain by mere visual inspection under ordinary light, this method is subject to frequent error for a number of reasons. First of all, many stains resemble each other so closely in color under ordinary light that they are difficult to accurately identify. Thus, a brown berry stain might be mistaken for a coffee stain or a blood stain. Greatly increased accuracy may be obtained by comparing the unknown to a number of prepared standard stains until a match is obtained. However, even recourse to prepared standards may not give entirely accurate results. Often the dyes and colors possessed by a fabric will mask a stain under ordinary light thus preventing its proper identification even when matched with prepared standards. Then again, a stain may be a mixture of two or more substances, one of which tends to mask the other. In this case, it is necessary to identify both substances before attempting removal since, unless they are removed in proper sequence, one or the other may be permanently set. To remedy this last mentioned difficulty, namely the difficulty of accurately matching the unknown with the standard under ordinary light, it has been found advantageous to make comparison under varying lighting conditions, particularly under ultra-violet light. Comparison under white light under favorable conditions may give accurate matchings as to color and shade, but when identifying stains and spots on garments, identification as to their chemical constitution rather than color or shade is the essential. Examination under ultra-violet light will greatly help in identifying the chemical constitution of a stain. The reason for this is that when the invisible ultra-violet light impinges on many chemical substances, it causes the substances to glow with a color which is characteristic of each particular substance. Some chemical substances do not glow, and that is also an aid in their chemical identification. This behavior coupled with that experienced under the white light served to their identification. When a substance glows under ultra-violet radiation, this phenomenon is called fluorescence. Each chemical or group of related chemicals will always fluoresce in the same way, despite the fact that under ordinary light the chemical could not be identified by its own color. Thus a coffee stain will always fluoresce in the same manner although its color might be masked by dyes on the fabric.

Similar problems to those encountered in dry cleaning establishments, where stains and spots must be identified, are met with where it is necessary to match various dyes, or to identify paint pigments or mixtures thereof. These may be identified accurately and quickly by comparison with prepared standards, particularly when examined under special light conditions, such as under ultra-violet light as discussed above.

There has long been a need in the dye and paint industry, and in the dry cleaning industry particularly, for a device which will assist in making rapid and accurate comparisons of an unknown stain or the like upon fabrics with a number of prepared standards under varying lighting conditions. Particularly, a device is needed which is compact and yet capable of storing a large number of standards in such a manner that they will be instantly accessible for comparison with the unknown. As a practical matter, in a dry cleaning establishment, between 75 and 150 standards are needed to accurately identify the range of spots and stains normally encountered.

An object of the present invention is to provide a unitary device for making visual comparison between an unknown stain, color, pigment, or the like upon fabrics and other solid surfaces, and a number of prepared standards, which is adapted to compactly store a large number of prepared standards in such a manner that each standard is instantly accessible for comparison with the unknown stain, color, or the like.

Another object of the invention is to provide a comparator for assisting in the identification of unknown stains, colors or the like upon fabrics and other solid surfaces which comparator is provided with a plurality of light sources, each of which emit light of different quality in order to facilitate accurate identification of the unknown.

Still another object of the invention is to provide a comparator of unitary construction which is adapted to compactly store a large number of prepared standards adjacent illuminated viewing stages for the standards and the unknown in such a manner that each standard may be quickly and conveniently brought into viewing position adjacent the unknown which is found upon fabrics, wooden surfaces or other solid surfaces for comparison.

A particular object of the invention is to provide a comparator of the type above referred to which is compact and unitary and which is excellently adapted to assist in the identification of unknown spots and stains or the like on textile goods in order that such spots and stains may be removed by the proper procedure.

Other objects and advantages of the present invention will become apparent from the detailed description below.

In general, the comparator of the invention comprises a movable magazine preferably of the rotating drum type, which device is capable of storing a large number of prepared standards fixed upon a plurality of solid surfaces. A viewing area or viewing stage thereof is provided adjacent the customary stop position of the magazine for viewing the standards, and a second viewing area or viewing stage thereof for viewing the unknown is provided adjacent the first viewing area or stage for the standards. In order to bring any given standard into viewing position in the viewing area for the standards the magazine is rotated or otherwise moved until the proper standard is brought into adjacency with the viewing area. The standard is then by suitable means moved relatively to the magazine and carried into viewing position.

In the preferred embodiment of my invention the standards are mounted on suitable carriers hereafter called pallets which are hingedly mounted at spaced intervals around the circumference of a drum-type rotating magazine. Rotation of the drum carries the pallets into adjacency with the viewing area for the standards and a stationary cam engaging with cam-followers carried by each of the pallets swings the pallets into viewing position in the viewing area as the magazine is rotated.

In another embodiment, the pallets are carried in slots around the periphery of a drum-type magazine. The magazine is rotated to bring the desired pallet into alignment with the viewing area for the standards, and then the pallet is ejected from the magazine into viewing position.

A plurality of light sources preferably of different types are provided to illuminate the viewing areas. Preferably all the elements of the device are assembled within a unitary housing provided with the necessary apertures therein positioned above the viewing areas for viewing the unknown and the standard and for positioning the unknown on its viewing stage.

In the description and drawings that follow, the invention will be described in terms of a device particularly adapted to identify stains on textiles; however, it is to be understood that the invention is not limited thereto. Modifications, such as will occur to a skilled mechanic, may be needed to adapt the device to identify other materials, such as dyes, pigments, or paints in form of a powder or otherwise. It is to be furthermore understood that the following description is illustrative merely, and the invention is not to be limited thereby nor in any way except by the scope of the appended claims.

Referring now to the drawings.

Fig. 6 is a perspective view showing a pallet adapted to have one or more standards mounted thereon and adapted to be used in conjunction with the stationary cam arrangement shown in Figs. 2, 4 and 5.

Fig. 8 is a view similar to that of Fig. 2 taken as on the line 2—2 of a housing similar to that shown in Fig. 2 but shows another embodiment of the invention in which the pallets are contained in slots around the periphery of the magazine and are ejected from the magazine to bring them into viewing position.

Figure 1:
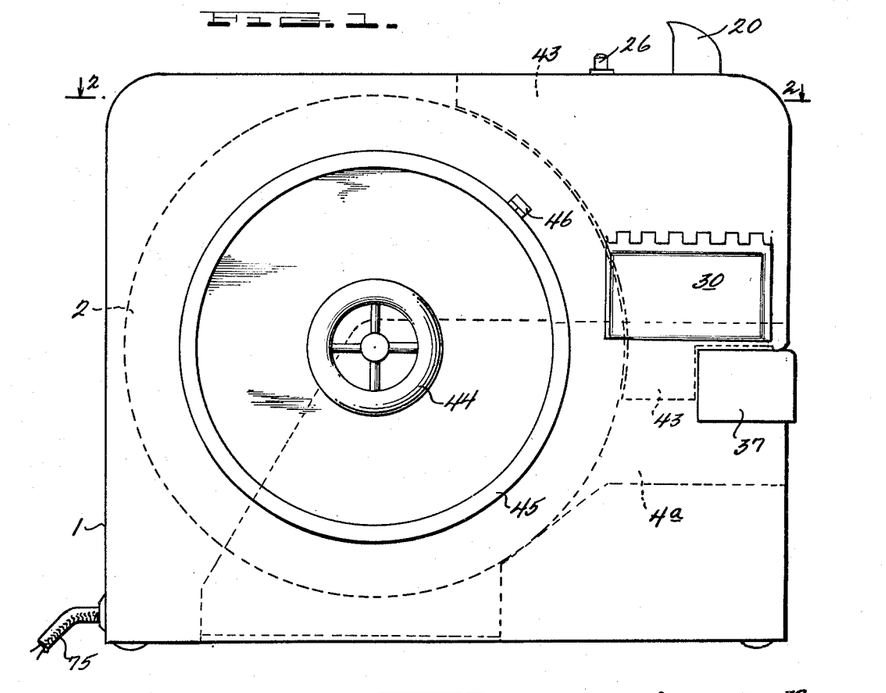
Fig. 1 is a side elevation of a comparator unit constructed in accordance with the present invention and illustrates the housing which is adapted to house both embodiments of my invention.
Figure 2:
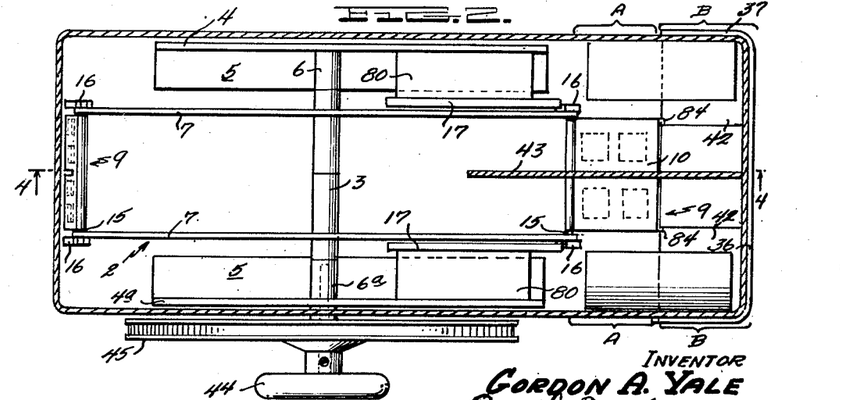
Fig. 2 is a section taken on the line 2—2 of Fig. 1 with some parts omitted for clarity.

Referring now more particularly to Figs. 1 and 2, the numeral 1 refers to a rectangular housing which encloses a drum-type magazine, generally denoted by the numeral 2, which is rotatably mounted within the housing on shaft 3. A pair of generally L-shaped supporting plates 4 and 4a each having a flange at the bottom thereof denoted by the numeral 5, are bolted or otherwise affixed in an upright position to the bottom of the housing 1 by means of the flanges 5. The shaft 3 is rotatably supported at its opposite ends by bosses 6 and 6a which are attached to supporting plates 4 and 4a respectively.

The drum-type magazine 2 is designed to compactly store a plurality of standards suitably mounted on a plurality of pallets 9. The drum comprises a pair of metal disks 7 which are attached to shaft 3 in spaced-apart relationship, thus forming the sides of the drum. The discs 7 are provided around their circumference with a plurality of pairs of oppositely aligned circular bores. A plurality of pallets or standard holders 9 (see Fig. 4) are hingedly mounted around the circumference of the drum 2 by means of shafts rotatably supported in these bores. As more particularly shown in Fig. 6, each pallet comprises a flat, rectangular sheet metal plate 10 provided with a central slot 11, the purpose of which will be explained below. One or more standard stains or the like 13 are mounted on plate 10, while above the standard in area 14 can be printed an appropriate designation. A shaft 15 somewhat longer than the width of the drum 2 supports the plate 10 and is preferably fastened to the plate by crimping the end of the plate around the shaft. The shaft 15 is provided at opposite ends with cam followers 16 the purpose of which will be described in detail below. In order to mount the pallet carried by shaft 15 in the drum, the shaft 15, with cam followers 16 removed, is inserted in a pair of the oppositely aligned circular bores adjacent the circumference of the drum. Cam-followers 16 are then fitted on both ends of the shaft which extend beyond the sides of the drum and are keyed to the shaft in a selected, fixed position. The shafts 15 are fitted in the bores in discs 7 in such a way that they are free to rotate, and thus form hinges on which the pallets 9 may freely swing. As can be seen particularly in Fig. 4 the pallets are mounted at spaced intervals preferably around the entire circumference of the drum, and hang downwardly under the action of gravity until they engage the stationary cams 17 as the drum is rotated, as will be more fully explained below.

Disposed at one end of the housing 1 is a first viewing area for viewing the standards. This first viewing area is designated generally by the letter A. As can be seen in Figs. 2 and 4, it is located adjacent the rotatable drum and corresponds to the plane assumed by the pallet when in horizontal position and extends transversely of the housing 1. A second viewing area, designated generally by the letter B, for viewing the unknown, extends transversely of the housing parallel to, and in the same plane as viewing area A. Both of these viewing areas are located in a horizontal plane approximately midway between the top and bottom of the housing. As will be later explained, means are provided in the viewing area A for supporting the pallets 9 on which the standards are mounted, and a viewing stage is provided in area B to support the unknown. Above these viewing areas is a viewing lens 18 (see Figs. 3 and 4), mounted in a bracket 19, which is fixed in an aperture in the housing 1. A suitable eye shield 20 is attached to the bracket 19.

Mounted along either side of the viewing areas A and B are light sources 21 and 22 (see Fig. 3), in each of which areas there is a pair of lamps preferably of the so-called fluorescent type, which are mounted on posts 23 which are supported on brackets 24 which in turn are welded or otherwise affixed to supporting plates 4 and 4a respectively. One pair of lamps is a source of white light and the other a source of ultraviolet radiation. Switches 25 and 26 for separately operating light sources 21 and 22 are conveniently positioned on the top of the housing near the viewing aperture. These switches are connected to the light sources by leads 27 and 28 respectively. Electric current is supplied to the lamps by a cable 75 (see Fig. 1) through suitable wiring connected to leads 29. Reflectors 76 focus the light on the viewing area. A hinged door 30 (see Fig. 1) on either side of the housing 1 permits access to the lamps should it be necessary to replace them.

Figures 3, 10:
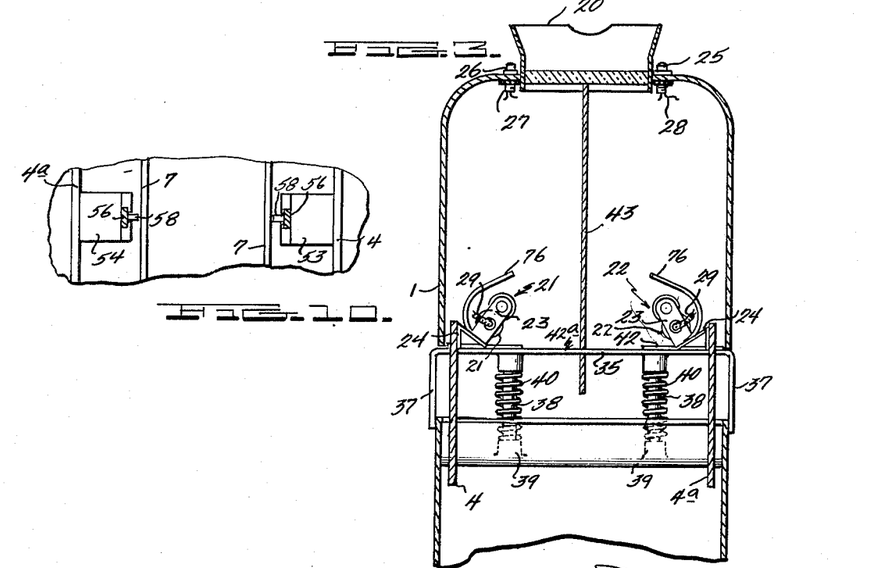
Fig. 3 is a section taken on line 3—3 of Fig. 2.
Fig. 10 is a view showing the details of an ejector mechanism for positioning the standards for observation.
Figure 4:
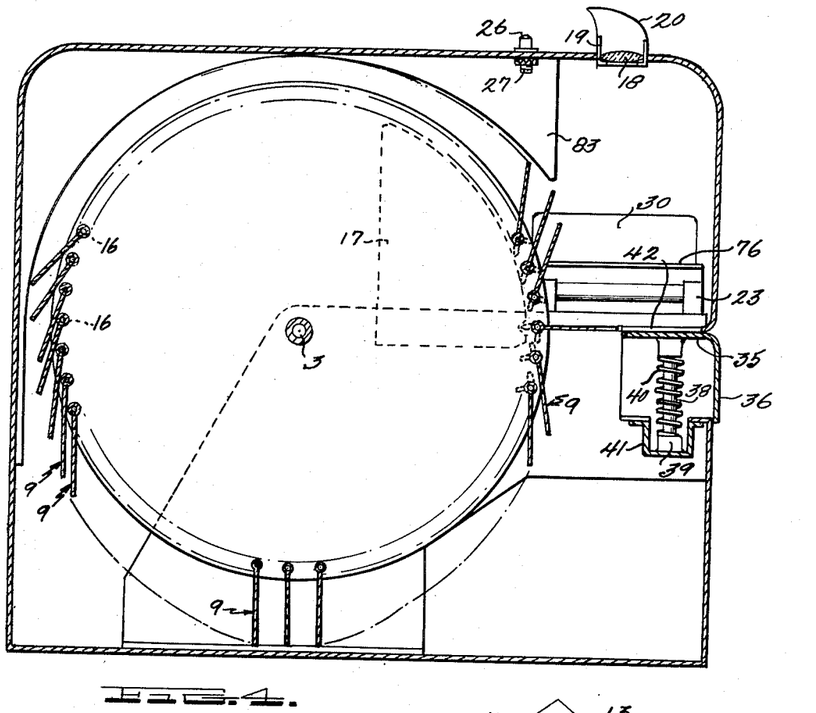
Fig. 4 is a section taken on line 4—4 of Fig. 2.

The viewing stage in area B which is particularly adapted to accommodate textile material comprises a spring pressed platform 35 extending entirely across the front of the housing (see Figs. 3 and 4). The platform 35 is provided with a front flange 36 and side flanges 37. Plungers 38 slide in bosses 39 which are supported by brackets 41. The plungers are urged upwardly by springs 40 and support the platform 35 from beneath, urging it into contact with a flange 42 (see Fig. 3) formed by turning inwardly a portion of the housing 1. The flange 42 is cut away adjacent the central portion of the platform 35 as at 42a (see Fig. 3). Thus, when a fabric is inserted between platform 35 and flange 42, it is pressed flat therebetween adjacent the outer edges while the portion of the fabric occupying the center of the platform (which is that portion opposite the viewing stage for the standard) is exposed to view for comparison with the standard. This pressing action on the fabric around the outer edges of the platform helps to keep the fabric flat at the center portion of the platform and thus keeps it in the same plane as the standards.

In one form of the invention, a baffle 43 (see Figs. 2 and 3) is provided which divides the viewing area A and B into two side-by-side regions, one on either side of the baffle. The baffle extends from the top of the housing, partially around the drum and below the plane of the viewing stage for the standards in area A. It is cut away, however, to accommodate the viewing platform 35, the lower edge of the baffle just barely touching platform 35 (see Fig. 1). As hereinbefore mentioned, pallets 9 are provided with central slots 11. When a pallet is swung into viewing position in area A by stationary cam 17 as will be hereafter explained, slot 11 in the pallet receives the baffle 43. An observer looking through the viewing lens 18 would see two separate side-by-side regions. With a pallet in position in area A he would also see one standard in each region (see Fig. 2).

In order to bring any desired standard into viewing position it is only necessary to rotate the drum 2 until the pallet on which the standard is mounted is brought adjacent the stationary cam 17. A hand knob 44 (see Figs. 1 and 2) keyed to the shaft 3, permits the operator to rotate the drum forward or backward at will. Adjacent the hand knob 44, and also keyed to the shaft 3 is an indexed wheel 45, provided with a pointer 46. Around the circumference of this wheel suitable markings may be inscribed to indicate the type of standards stored in the drum 2 and the sequence in which they occur. The pointer 46 is adjusted in a position so that it may be conveniently observed by the operator. Properly positioned, it will indicate what type of standard is in registry with the viewing stage for the standards in any position of the drum.

It will be noted that two stationary cams 17 are provided, one on each side of the drum 2 adjacent the viewing area A. Cams 17 are rigidly mounted in the housing by means of brackets 80 which in turn are welded or otherwise affixed to supporting plates 4 and 4a respectively (see Fig. 2).

Figure 5:
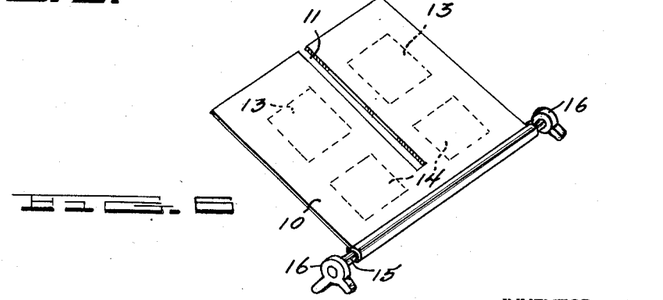
Fig. 5 is a view showing the details of the stationary cam which swings the pallets holding the standards into viewing position.

Referring now particularly to Figs. 4 and 5, it will be seen that the cams 17 are each provided with a lower cam surface 17a and an upper cam surface 17b and with a groove 17c between the upper and lower cam surfaces. Each cam follower 16 is provided with a set of pawls comprising a pawl 81 which is adapted to engage the lower cam surface 17a on rotation of the drum and a second pawl 82 which is adapted to engage the upper cam surface 17b. On rotation of the drum, it can be readily seen that the cam followers 16 will successively engage the stationary cams 17. When the drum is rotated in a counterclockwise direction as viewed in Figs. 4 and 5, it can be seen that the pawls 81 will successively engage the lower cam surface 17a, and on further rotation of the drum, the pallet will be swung into viewing position, the pawl 82 entering the groove 17c when the pallet is horizontal (see Fig. 4). As the drum is rotated still further in a counter-clockwise direction, the pawl 82 engages the upper cam surface 17b and the pallet is swung upwardly out of viewing position. After leaving the upper cam surface 17b, the pawl 82 begins to slide against a continuation 17d of the upper cam surface 17b. The portion 17d of the cam 17 extends nearly to the top of the drum and substantially parallels the circumference of the drum. The pallets sliding along the portion 17d of the cams are thus kept upright and in phase with one another until the pallets are laid over against one another by the action of gravity as they approach the top of the drum. A baffle 83 may be provided around the upper portion of the drum to further insure that the pallets do not lose phase.

When the drum is rotated in a clockwise direction (as viewed in Figs. 4 and 5), the pawls 82, sliding down the portion 17d of the cam 17, successively engage the upper cam surface 17b and slide into groove 17c under the action of gravity. On further rotation of the drum, pawls 81 engage the lower cam surface 17a and the pallets are swung downwardly out of viewing position.

Figures 7, 12:
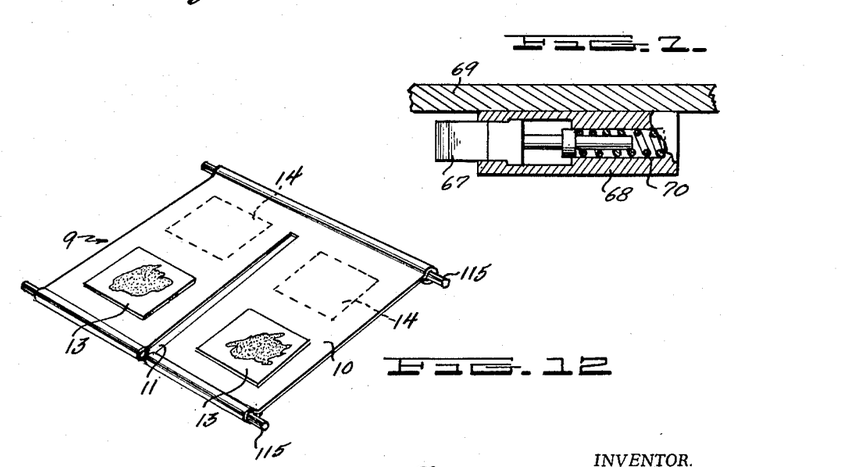
Fig. 7 is a view showing the details of an indexing pin which provides means for holding the rotatable magazine in desired position.
Fig. 12 is a perspective view showing a standard stain pallet adapted to be releasably stored in a magazine.

In order to check the free rotation of the drum and to index the pallets 9 into their proper horizontal viewing position an indexing pin 67 is provided (see Fig. 5) carried in a housing 68 which is mounted opposite one of the discs 7 which form the sides of the drum. Housing 68 may be attached in any suitable manner (see Fig. 7) to a supporting member 69 which in turn may be rigidly attached to the supporting plate 4a. A number of notches 89 are provided at spaced intervals around the periphery of disc 7. Pin 67 is urged against the notched periphery of disc 7 by a compression spring 70. As shown in Fig. 7, the pin is fully extended, while in Fig. 5 the pin is partially retracted as it bears against the unnotched portion of the disc. As the drum is rotated, the pin rides in and out of the notches 89, the notch contacting portion of pin 67 being suitably tapered to permit rotation of the drum in either direction without undue friction. The pin 67 is so positioned in respect to the notches 89, and the notches 89 are so spaced, that whenever the pin enters a notch in the disc 7, a pallet will be indexed into horizontal viewing position and held in this position against accidental displacement.

To further guarantee that the pallets will be held in proper horizontal viewing position, a pair of spring clips 84 are provided, one on each side of the pallet (see Fig. 2). Clips 84 are attached to flange 42 in any suitable manner. As can be seen more clearly in Fig. 5, spring clips 84 consist of resilient leaf springs having a generally U-shaped cross-section, the legs of the U being fastened to the flange 42. As the pallets 9 swing past the flange 42, the clips 84 lightly engage the forward tip of the pallet and hold the pallet in correct viewing position until the drum is further rotated. The frictional engagement of the clips 84 with the pallets is quite light in order that the drum may be rapidly rotated without undue resistance. The cam 17 and the spring clips 84 together support the pallets in correct viewing position in viewing area A, in which position the pallets form a stage.

It has been designated supra in describing Figs. 1 and 2 that the second viewing area B, for viewing the unknown, extends transversely of the housing parallel to, and in the same plane as viewing area A. And it was specified that both of these areas are located in a horizontal plane approximately midway between the top and bottom of the housing. This is a preferable condition but not absolutely essential. Design limitation may demand that the two viewing stages be at an angle to each other as well as at an angle to the horizontal. The acceptable condition, however, will be such that efficient viewing can be accomplished, yet while working under comfortable conditions.

The operation of the device will now be described. The operator takes a position facing the viewing aperture and the depressible platform for accommodating the garment or the like bearing the spot or stain to be identified. To his left is the hand knob 44 for rotating drum 2 to the desired position.

The garment is inserted between the flange 42 and platform 35 by sliding it between the two so that it lies flat against the platform 35 with the questionable area exposed to view in viewing area B. The garment platform 35 may be conveniently designed to accept material up to three inches in thickness.

The operator having previously made a preliminary judgement as to the type of stain on the garment, rotates the hand knob 44 until the pallet carrying that type of standard stain is brought into viewing position. This will be indicated by indexed wheel 45 and pointer 46 or by observation by the operator through viewing lens 18. The operator, having switched on one of the lights, views the standard and the unknown simultaneously through viewing lens 18 which is preferably a high quality magnifying lens. As previously mentioned, comparison of the unknown with the standard under ordinary light does not always give accurate identification. Therefore, besides a source (preferably of white light) on one side of viewing areas A and B, there is a source (preferably of ultra-violet light) on the other side of the viewing areas. In the preferred method of identifying stains, the unknown stain is compared with the standard stain first under the white light. If a check is not obtained with the standard under white light, the operator rotates the drum forward or backwards to align another pallet with the viewing stage. The standard mounted on this pallet is then compared with the unknown stain under white light. When a standard stain is found which checks with the unknown stain under white light, the white light is switched off and the ultra-violet light switched on. On further comparison under ultra-violet light, if the unknown and the standard are found to fluoresce in the same manner, it can be fairly assumed that the stain or spot has been correctly identified. Reference is then made to the printed matter 14 above the standard on the pallet which may either give the proper procedure for removing the stain or give a reference to a suitable text which explains the proper removal procedure.

In one form of the invention, a baffle 43 is provided dividing the viewing areas A and B into two side-by-side regions, as previously explained. When the baffle is employed, the garment is slid along the platform 35 until the questionable area is entirely on one side of the baffle. Both light sources are then switched on, the baffle effectively preventing any mingling of the light from the two sources. The operator then compares the unknown stain and one of the two identical standards mounted side by side on a pallet 9. Having found a standard which checks with the unknown stain under white light, the operator then shifts the garment laterally until the questionable area lies on the other side of the baffle under ultra-violet light. He then compares the unknown spot or stain with the second of the two identical standards mounted on the pallet under this second light source. It can be readily seen that the use of two identical standards mounted side by side on the pallet eliminates the need for moving the standards as well as the garment when using the baffle 43. When white light and ultra-violet are used as the two light sources, positive identification will be obtained if the unknown checks with the standards under both. The advantage in using the baffle 43 is that both light sources may be kept burning constantly while the device is being used. This eliminates the extra step of switching the lights on and off. In the case of the so-called fluorescent type lamps, which preferably are used, this adds materially to the life of the lamps since fluorescent type lamps are burned out much more rapidly when they are switched on and off frequently. Furthermore, with this type of lamp there is often some delay in starting after switching on the lamp.

A second embodiment of my invention is illustrated in Figs. 8 to 12 inclusive and will now be described particularly below. A housing similar to that shown in Figure 1 is employed to house this embodiment of the invention, and in most respects this second embodiment is similar to the embodiment described above, the principal difference being in the manner in which the pallets are mounted in the drum 2 and the manner in which the pallets are carried into viewing position.

Referring now particularly to Fig. 2, where similar parts are designated by the same numbers, as in the embodiment described above, it can be seen that the numeral 1 refers to a rectangular housing which encloses a drum-type magazine, generally denoted by the numeral 2, which is rotatably mounted within the housing on shaft 3. A pair of generally L-shaped supporting plates 4 and 4a each having a flange at the bottom thereof denoted by the numeral 5, are bolted or otherwise affixed in an upright position to the bottom of the housing 1 by means of the flanges 5. The shaft 3 is rotatably supported at its opposite ends by bosses 6 and 6a which are attached to supporting plates 4 and 4a respectively.

Figure 9:
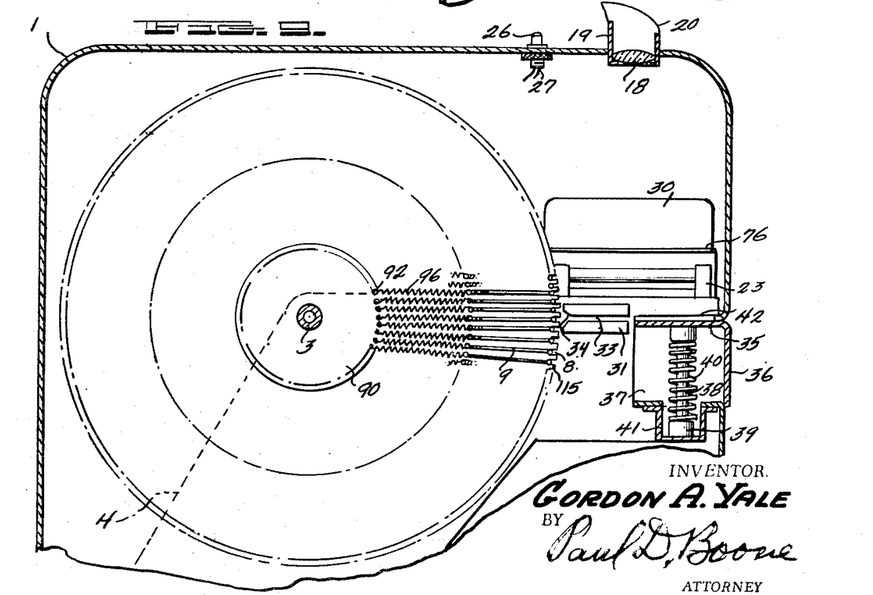
Fig. 9 is a sectional view taken on the line 9—9 of Fig. 8.

The drum-type magazine 2 is designed to releasably store a plurality of standards. The drum comprises a pair of metal discs 7 which are attached to shaft 3 in spaced apart relationship, thus forming the sides of the drum. The discs 7 are provided around their outer circumference with a plurality of radially extending slots 8 (see Fig. 9) which are oppositely aligned. Each pair of oppositely aligned slots 8 is adapted to receive a pallet or standard holder 9. As more particularly shown in Fig. 12, each pallet or standard holder comprises a flat rectangular sheet metal plate 10 provided with a central slot 11, the purpose of which will be explained below. At opposite ends, the pallet 9 is provided with supporting rods 115 which extend beyond the plate 10 a short distance in either direction. Rods 115 are preferably fastened to the plate 10 by crimping the opposite ends of the plate around the rods as shown. Rods 115 are of slightly lesser diameter than the width of slots 8 in the discs 7 so that the opposite ends thereof will slide freely in slots 8. One or more standard stains or the like 13 are mounted on plate 10, while above the standard, in area 14 can be printed an appropriate designation. As can be seen in Fig. 9, each of the pallets are mounted in the drum 2 by sliding the pallet into the slots 8. Thus the pallet will be supported at opposite ends by the extending end portion of rods 115.

A disc 90 is welded or otherwise attached at its center to shaft 3 at the midpoint between discs 7. A plurality of retaining springs 91 are attached at points 92 to the circumference of the disc 90. The opposite end of each spring 91 is attached to the midpoint of a pallet. The pallet is thus inwardly urged of the drum and retained against sliding out of the slots 8 by the action of gravity.

Disposed at the opposite end of the housing from the drum 2 are viewing areas A and B, arranged in the same manner as viewing areas A and B in the first embodiment described above. Likewise, a viewing aperture equipped with a viewing lens 18 is provided as in the first embodiment and the lighting equipment shown in this second embodiment is identical with lighting equipment described in the first embodiment.

A sectional view taken on the line 3'—3' of Fig. 8 would be identical to Fig. 3 of the drawings (which was taken on line 3—3 of Fig. 2) thus demonstrating the identical construction for the depressible, spring-pressed platform for supporting the fabric bearing the unknown stain, and the identical construction for the baffle 43.

A different type of construction, however, has been provided for the viewing stage which supports the pallets in viewing area A. Referring now particularly to Figs. 8 and 9, the numerals 31 and 32 refer to parallel plates which are welded to and extend horizontally from the inner walls of the supporting plates 4 and 4a. The plates 31 and 32 are provided with horizontal slots 33 (see Fig. 9) for receiving the end portions of rods 115 which support pallets 9. Plates 31 and 32 are so positioned that slots 33 run parallel to slots 8 in the discs 7. When pallets 9 are ejected forwardly one at a time from the magazine into the viewing area A by means later to be described, the extending end portions of rods 115 engage the slots 33 in plates 31 and 32 on either side of the pallet. Thus, when ejected from the magazine, the pallets are supported in area A by slotted plates 31 and 32, said plates forming a supporting stage therefor. As seen in Figs. 4 and 5, slots 33 are bevelled as at 34 to facilitate the entrance of rods 115.

Since the standard stain pallets are stored around the entire circumference of the drum, it is only necessary to rotate the drum to bring any desired standard into registry with the supporting stage for the pallets defined by the slotted plates 31 and 32. As in the first embodiment, a hand knob 44 (see Figs. 1 and 2), keyed to the shaft 3, permits the operator to rotate the drum to any desired position. Adjacent the hand knob 44, and also keyed to the shaft 3 is an indexed wheel 45, provided with a pointer 46. Around the circumference of this wheel suitable markings may be inserted to indicate the type of standards stored in the drum 2 and the sequence in which they occur. The pointer 46 is adjusted in a position so that it may be conveniently observed by the operator. Properly positioned, it will indicate what type of standard is in registry with the viewing stage for the standards (defined by slots 33 in horizontal plates 31 and 32) in any position of the drum.

Figure 11:
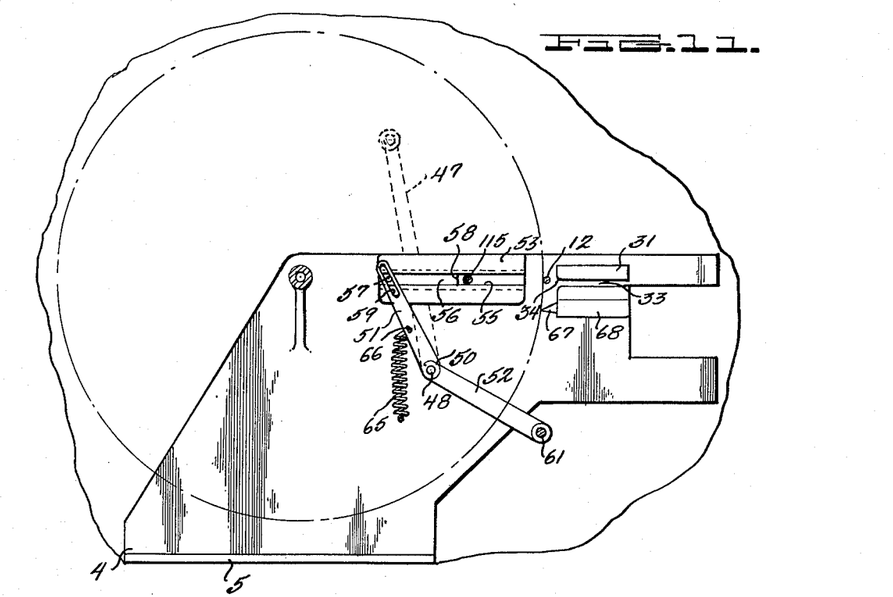
Fig. 11 is a view showing further details of the ejector mechanism.

After the desired pallet is brought into registry with the viewing stage for the standards, the operator may eject the pallet from the drum by swinging a crank 47 located on the opposite side of the housing from the hand knob 44. The details of the ejector mechanism are shown in Figs. 8, 10, and 11. The crank 47 is keyed to a shaft 48 (see Fig. 11) which is rotatably carried by a boss 49 which in turn is welded in the supporting plate 4. A collar 50 is keyed to the shaft 48 at the other end of the boss 49. Rigidly attached to this collar are two arms 51 and 52 respectively.

In a plane substantially coincident with the plane of the viewing stages, plates 53 and 54 are welded to supporting plates 4 and 4a respectively. Plates 53 and 54 are provided with parallel horizontal slots 55 which are parallel to slots 33 in plates 31 and 32. Sliding in slots 55 are bars 56, each carrying a pin 57 at one end thereof and a lug 58 at the opposite end (see Fig. 10 which is an end view of blocks 53 and 54 showing details of the bars 56 sliding in slots 55).

Sliding bars 56 are operatively connected to the crank 47 at one side of the housing by means of arm 51 which is slotted at 59 to slidably receive pin 57; and at the other side of the housing by means of an arm 60 similar in all respects to arm 51. Arm 60 is connected to the crank through a linkage which comprises the arm 52 which, as before noted, is rigidly attached to a collar 50 which in turn is keyed to the shaft 48. Arm 52 is rigidly linked to a connecting rod 61 which extends underneath the drum to the other side of the housing where it is rigidly connected to an arm 62 similar to arm 52. A boss 63 similar to boss 49 is welded to supporting plate 4a, and supports a stub shaft on which collar 64 is rotatably mounted. Arms 60 and 62 are rigidly connected to collar 64 and rotate therewith.

Thus, when crank 47 is rotated clockwise (as viewed in Fig. 11), arm 51 and arm 60 (through the linkage described above) are likewise rotated in a clockwise direction urging sliding bars 56 to the right. Lugs 58, carried by bars 56, engage the extending end portions of rod 115 (see Fig. 8) carried by pallet 9. As rotation of the crank continues, the pallet will be ejected from the drum and into the viewing area A where it will be supported at opposite sides by the end portions of rods 115 resting in slots 33 in plates 31 and 32. In order that the retaining springs 91 will not return the pallet to its position in the drum when the crank 47 is released, spring 65 is provided, attached at one end to the middle of arm 51 and at the other end to any convenient stationary portion of the frame. Spring 65 is positioned so that when arm 51 is in the position shown in Fig. 11, spring 65 will be to the left of the axis of rotation (defined by shaft 48) of arm 51 and thus arm 51 will be urged by spring 65 in a counter-clockwise direction, preventing an accidental ejection of a pallet 9. When crank 47 is rotated clockwise (as viewed in Fig. 11) against the action of spring 65, the point of attachment 66 of spring 65 to the arm 51 will be rotated clockwise also until the spring 65 lies to the right of the axis of rotation of the arm 51. In this position, spring 65 will urge arm 51 in a clockwise direction and, since spring 54 is stronger than retaining springs 91, the pallet will be held in position in viewing area A until the ejector is returned to its original position, at which time it will be returned to the magazine by retaining springs 91.

In order to check the free rotation of drum 2 and to index the slots 8 into perfect alignment with slots 33 in plates 31 and 32, an indexing pin 67 is provided carried in a housing 68 which is mounted below plate 31 opposite the slotted periphery of disc 7. Indexing pin 67 operates in the same manner as the indexing pin shown in Fig. 7 and described in connection with the first embodiment of the invention. As drum 2 is rotated, the pin rides in and out of slots 8 in the circumference thereof, the slot contacting portion of pin 67 is suitably tapered to permit rotation of the drum in either direction without undue friction. The pin 67 is so positioned that when it enters a slot 8 in the disc 7, a pallet 9 will be in perfect alignment with the slots 33 in plates 31 and 32.

The operation of the second embodiment is similar to the operation described above in relation to the first embodiment. Of course, a different procedure is followed in bringing the pallets into viewing position. In the first embodiment the pallets automatically swing into position, through the action of a stationary cam as the drum is rotated. In the second embodiment, the operator rotates the hand knob 44 until the pallet carrying the desired type of standard is opposite the viewing stage for the standard. This will be indicated by indexed wheel 45 and pointer 46. The operator then ejects this standard carried by pallet 9 from the magazine into the viewing area A by rotating the crank 47 in a clockwise direction (as viewed in Fig. 11). As previously explained, spring 65 retains the ejector mechanism and the pallet in this position. In order to return the pallet to the drum, the operator rotates the crank 47 in a counterclockwise direction and the pallet is returned to its position in the drum through the action of retaining springs 91. The drum may then be rotated forward or backwards to align another standard with the viewing stage.

It is apparent that many modifications of the device as described and shown in the drawings may be made without departing from the spirit of the invention. For instance, the magazine for storing the standards need not necessarily be in the form of a drum, although this is the preferred form. It may instead be constructed as an elongated rectangular box which is movably mounted in the housing so that it may be reciprocated past viewing area A to permit the standards to be moved one at a time into viewing position. The baffle 43 may be omitted although it forms an important part of the invention. Other means than those disclosed may be provided to move the pallets relatively to the magazine into viewing position, although the particular means described form important features of the invention. Suitable retaining means, other than springs 91 may be employed to secure the pallets in the slotted periphery of the magazine 2. Moreover where it is desired to identify other unknowns than stains, occurring on textile articles or otherwise, suitable modification of the viewing stage 35 may be made. Instead of two light sources as described, any number may be used which will aid in accurately identifying any given unknown. When identifying stains on textiles, it has been found that alternate comparison under white and ultra-violet light is sufficient to obtain accurate identification. However, any other combination of light sources may be employed if found desirable. These and other modifications within the spirit of the invention are intended to be included within the scope of the following claims.

I claim:

1. A comparator for assisting in the identification of unknown stains, colors and the like, comprising a housing, a drum-type magazine for storing a plurality of standards rotatably mounted in said housing, a plurality of shafts rotatably mounted at spaced intervals around the circumference of said magazine, each of said shafts having a cam-follower attached thereto, a plurality of pallets each attached to one of said shafts and each pallet having at least one of said standards mounted thereon, a first viewing area in said housing adjacent said magazine for viewing said standards, means for rotating said magazine to bring said pallets one at a time into adjacency with said first area, a stationary cam adjacent said first viewing area adapted to engage successively with each of said cam-followers as said magazine is rotated, whereby said pallets are successively brought one at a time into viewing position in said first viewing area, a second viewing area for the unknown in said housing adjacent said first viewing area, and a viewing aperture in said housing above the viewing areas for simultaneously viewing the unknown and at least one of said standards.

2. A comparator for assisting in the identification of unknown stains, colors and the like, comprising a housing, a drum-type magazine for storing a plurality of standards rotatably mounted in said housing, a plurality of shafts rotatably mounted at spaced intervals around the circumference of said magazine, each of said shafts having at least one cam-follower attached thereto, each of said cam-followers comprising a first pawl, and a second pawl spaced angularly from the first, a plurality of pallets each attached to one of said shafts and each pallet having at least one of said standards mounted thereon, a first viewing area in said housing above the viewing areas adjacent said magazine for viewing said standards, means for rotating said magazine to bring said pallets one at a time into adjacency with said first viewing area, a stationary cam adjacent said first viewing area comprising a lower cam surface for engaging the first of said pawls, an upper cam surface for engaging the second of said pawls, a groove in said cam between said upper and lower cam surfaces, each of said cam surfaces being adapted to engage successively said pawls as said magazine is rotated, whereby each of said pallets are successively brought one at a time into viewing position in said first viewing area, and on continued rotation of said magazine are carried out of said first viewing area, a second viewing area for the unknown in said housing adjacent said first viewing area, and a viewing aperture in said housing above the viewing areas for simultaneously viewing the unknown and at least one of said standards.

3. A comparator for assisting in the identification of unknown stains, colors and the like, comprising a housing, a drum-type magazine for storing a plurality of standards rotatably mounted in said housing, a plurality of pallets hingedly mounted at spaced intervals around the circumference of said magazine, each of said pallets having a cam-follower attached thereto, and each of said pallets having at least one of said standards mounted thereon, a viewing area in said housing adjacent said magazine for viewing said standards, means for rotating said magazine to bring said pallets one at a time into adjacency with said viewing area, a stationary cam adjacent said viewing area adapted to engage successively with each of said cam-followers as said magazine is rotated, whereby said pallets are successively brought one at a time into viewing position in said viewing area, and a second viewing area for the unknown in said first housing adjacent said viewing area and a viewing aperture in said housing above the viewing areas for simultaneously viewing the unknown and at least one of said standards.

4. A comparator for assisting in the identification of unknown stains, colors or the like, comprising a housing, a drum-type magazine for storing a plurality of standards rotatably mounted in said housing, a plurality of pallets hingedly mounted at spaced intervals around the circumference of said magazine, each of said pallets having a cam-follower attached thereto, and each of said pallets having at least one of said standards mounted thereon, a viewing area in said housing adjacent said magazine for viewing said standards, means for rotating said magazine to bring said pallets one at a time into adjacency with said viewing area, a stationary cam adjacent said viewing area adapted to engage successively with each of said cam-followers as said magazine is rotated, whereby said pallets are successively brought one at a time into second viewing position in said viewing area, a viewing area for the unknown in said housing adjacent said first viewing area, an aperture in said housing adjacent said second viewing area to permit positioning of the unknown on said viewing stage, at least one light source in said housing for illuminating said first viewing area and said second viewing area, and the said housing having a viewing aperture therein above the viewing areas for simultaneously viewing the unknown and at least one of the standards.

5. A comparator for assisting in the identification of unknown stains, colors and the like, comprising a housing, a drum-type magazine for storing a plurality of standards rotatably mounted in said housing, a plurality of pallets hingedly mounted at spaced intervals around the circumference of said magazine, each of said pallets having a cam-follower attached thereto, and each of said pallets having at least one of said standards mounted thereon, a viewing area in said housing adjacent said magazine for viewing said standards, means for rotating said magazine to bring said pallets one at a time into adjacency with said viewing area, a stationary cam adjacent said viewing area adapted to engage successively with each of said cam-followers as said magazine is rotated, whereby said pallets are successively brought one at a time into viewing position in said viewing area, a second viewing area for the unknown in said housing adjacent said first viewing area, a viewing aperture in said housing above the viewing areas for simultaneously viewing the unknown and at least one of said standards, a baffle in said housing dividing both said viewing area and said viewing stage into two side-by-side regions, a first light source in said housing for illuminating one of said regions, a second but different light source in said housing for illuminating the other of said regions, and an aperture in said housing adjacent said second viewing area to permit positioning of the unknown thereon.

6. A device for assisting in the identification of unknown stains on textiles, comprising a housing, a drum-type magazine for storing a plurality of standards rotatably mounted in said housing, a plurality of pallets hingedly mounted at spaced intervals around the circumference of said magazine, each of said pallets having a cam-follower attached thereto, and each of said pallets having at least one of said standards mounted thereon, a viewing area in said housing adjacent said magazine for viewing said standards, means for rotating said magazine to bring said pallets one at a time into adjacency with said viewing area, a stationary cam adjacent said viewing area adapted to engage successively with each of said cam-followers as said magazine is rotated, whereby said pallets are successively brought one at a time into viewing position in said viewing area, a viewing stage constructed to accommodate textile material adjacent said viewing area for the standards, said viewing stage comprising a depressible, spring-pressed platform, said platform being accessible through an aperture in said housing, and a viewing aperture in said housing above the said viewing area and the said viewing stage.

7. A comparator for assisting in the identification of unknown stains, colors and the like, comprising a housing, a drum-type magazine for storing a plurality of different comparison standards rotatably mounted on a horizontal axis in said housing, and having a plurality of radial slots regularly spaced around the circumference thereof, a plurality of pallets releasably secured in said slots, each of said pallets having at least one of said standards mounted thereon, a viewing area in said housing adjacent said magazine for viewing said standards, means outside said housing for rotating said magazine to bring each of said pallets one at a time into registry with said viewing area, means for ejecting said pallets one at a time from said magazine into said viewing area, a viewing stage for the unknown in said housing adjacent said viewing area, an aperture in said housing adjacent said viewing stage to permit positioning of the unknown on said viewing stage, and a viewing aperture in said housing for simultaneously viewing the unknown and at least one of said standards above the viewing area and the viewing stage.

8. A comparator for assisting in the identification of unknown stains, colors and the like, comprising a housing, a drum-type magazine rotatably mounted on a horizontal axis in said housing for storing a plurality of different comparison standards and having a plurality of radial slots regularly spaced around the circumference thereof, a viewing area in said housing adjacent said magazine for viewing said standards, means for moving said magazine to bring said standards one at a time into alignment with said viewing area, means for ejecting said standards one at a time from said magazine into said viewing area, a viewing stage for the unknown adjacent said viewing area, and a plurality of light sources of the fluorescent type giving white light and ultraviolet light in said housing for illuminating said viewing area and said viewing stage, and a viewing aperture in said housing above the said viewing area and the said viewing stage.

9. A comparator for assisting in the identification of unknown stains, colors and the like, comprising a housing, a drum-type magazine for storing a plurality of different comparison standards rotatably mounted on a horizontal axis in said housing, and having a plurality of radial slots spaced around the circumference thereof, a plurality of pallets releasably secured in said slots, retaining means for each of said pallets for resiliently urging said pallets into said slots, each of said pallets having at least one of said standards mounted thereon, a viewing area in said housing adjacent said magazine, means operable from outside said housing for rotating said magazine to bring each of said pallets one at a time into registry with said viewing area, means operable from outside said housing for ejecting said pallets one at a time from said magazine into said viewing area, and a viewing stage for the unknown in said housing adjacent said viewing area, and a viewing aperture in said housing above the said viewing area and the said viewing stage.

10. A device for assisting in the identification of unknown stains on textiles, comprising a housing, a drum-type magazine for storing a plurality of different comparison standards rotatably mounted on a horizontal axis in said housing, and having a plurality of radial slots spaced around the circumference thereof, a plurality of pallets releasably secured in said slots, each of said pallets having at least one of said standards mounted thereon, a viewing area in said housing adjacent said magazine for viewing said standards, means outside said housing for rotating said magazine to bring each of said pallets one at a time into registry with said viewing area, means for ejecting said pallets one at a time from said magazine into said viewing area, a viewing stage constructed to accommodate textile material adjacent said viewing area, said viewing stage comprising a depressible, spring-pressed platform, said platform being accessible through an aperture in said housing, and a viewing aperture in said housing above the said viewing area and the said viewing stage.

11. A visual comparator for assisting in the identification of unknown stains, colors and the like, comprising a housing, a magazine rotatably mounted on a horizontal axis in said housing, a plurality of different comparison standards mounted upon a series of solid, opaque surfaces, said opaque surfaces being mounted upon said magazine and movable relative thereto, a first viewing area for viewing said standards which viewing area is adjacent said magazine and represents the plane assumed by a standard when in the stop position for comparison with the unknown, means for moving said magazine to bring said standards one at a time into adjacency with said first viewing area, means for moving said standards relative to said magazine when adjacent the viewing area to bring said standards one at a time into viewing position in said first viewing area, a second viewing area with an opaque platform also within said housing to support the unknown in this said area, this second viewing area being positioned adjacent the first viewing area, and the said housing having an aperture in it through which these two areas may be viewed simultaneously in making comparisons.

12. A visual comparator for assisting in the identification of unknown stains, colors and the like, comprising a housing, a magazine, rotatably mounted on a horizontal axis in said housing, a plurality of different comparison standards mounted upon a series of solid, opaque surfaces, a series of spaced recesses in said magazine for storing the said standards, a first viewing area for viewing said standards which viewing area is adjacent said magazine and represents the plane assumed by a standard when in the stop position for comparison with the unknown, means for moving said magazine to bring said standards one at a time into adjacency with said first viewing area, means for ejecting said standards from the magazine when adjacent the viewing area to bring said standards one at a time into viewing position in said first viewing area, a second viewing area with an opaque platform also within said housing to support the unknown in this area, the second viewing area being positioned adjacent the first viewing area, and the said housing having an aperture in it through which these two areas may be viewed simultaneously in making comparisons.

13. A visual comparator for assisting in the identification of unknown stains, colors and the like, comprising a housing, a magazine rotatably mounted on a horizontal axis in said housing, a plurality of different comparison standards mounted upon a series of solid, opaque surfaces, said opaque surfaces being mounted upon said magazine and movable relative thereto, a first viewing area for viewing said standards which viewing area is adjacent said magazine and represents the plane assumed by a standard when in the stop position for comparison with the unknown, means for moving said magazine, a stationary cam, and means affixed to the standard mounting surfaces for coacting with said stationary cam to bring said standards one at a time into adjacency with said first viewing area, means for moving said standards relative to said magazine when adjacent the viewing area to bring said standards one at a time into viewing position in said first viewing area, a second viewing area with an opaque platform also within said housing to support the unknown in this said area, this second viewing area being positioned adjacent the first viewing area, and said housing having an aperture in it through which these two areas may be viewed simultaneously in making comparisons.

14. A visual comparator for assisting in the identification of unknown stains, colors and the like, comprising a housing, a magazine rotatably mounted on a horizontal axis in said housing, a plurality of different comparison standards mounted upon a series of solid, opaque surfaces, said opaque surfaces being mounted upon said magazine and movable relative thereto, a first viewing area for viewing said standards which viewing area is adjacent said magazine and representing the plane assumed by a standard when in the stop position for comparison with the unknown, means for moving said magazine to bring said standards one at a time into adjacency with said first viewing area, means for moving said standards relative to said magazine when adjacent the viewing area to bring said standards one at a time into viewing position in said first viewing area, a second viewing area with an opaque platform also within said housing to support the unknown in this said area, this second viewing area being positioned adjacent the first viewing area, and said housing having an aperture adjacent said second viewing area to permit positioning of the unknown on the platform in this said area, and said housing also having an aperture through which these two areas may be viewed simultaneously in making comparisons.

15. A visual comparator for assisting in the identification of unknown stains, colors and the like comprising a housing, a drum type magazine rotatably mounted on a horizontal axis in said housing, a plurality of opaque pallets mounted at spaced intervals around the circumference of said magazine and movable relative thereto, each of said pallets having at least one comparison standard mounted thereon, a first viewing area for viewing said standards which viewing area is adjacent said magazine and represents the plane assumed by a standard when in the stop position for comparison with the unknown, means for moving said magazine to bring said standards one at a time into adjacency with said first viewing area, means for moving said standards relative to said magazine when adjacent the viewing area to bring said standards one at a time into viewing position in said first viewing area, a second viewing area with an opaque platform also within said housing to support the unknown in this said area, this second viewing area being positioned adjacent the first viewing area, and the said housing having an aperture therein through which these two areas may be viewed simultaneously in making comparisons.

16. A visual comparator for assisting in the identification of unknown stains, colors, and the like, comprising a housing, a magazine rotatably mounted on a horizontal axis in said housing, a plurality of different comparison standards mounted upon a series of solid, opaque surfaces, said opaque surfaces being mounted upon said magazine and movable relative thereto, a first viewing area for viewing said standards which viewing area is adjacent said magazine and represents the plane assumed by a standard when in the stop position for comparison with the unknown, means for moving said magazine to bring said standards one at a time into adjacency with said first viewing area, means for moving said standards relative to said magazine when adjacent the viewing area to bring said standards one at a time into viewing position in said first viewing area, a second viewing area with an opaque platform also within said housing to support the unknown in this said area, this second viewing area being positioned adjacent the first viewing area, and the said housing having an aperture through which these two areas may be viewed simultaneously in making comparisons, a baffle in said housing dividing both viewing areas into two side-by-side regions, a first light source in said housing for illuminating one of said regions, a second light source in said housing for illuminating the other of said regions, and the said housing having an aperture adjacent the platform in the second viewing area to permit positioning of the unknown thereon.

17. A comparator for assisting in the identification of unknown stains, colors and the like, comprising a housing, a drum type magazine rotatably mounted on a horizontal axis in said housing, a plurality of different comparison standards mounted upon a series of solid, opaque surfaces, said opaque surfaces being mounted upon said magazine and movable relative thereto, a first viewing area in said housing for viewing said standards which viewing area is adjacent said magazine and representing the plane assumed by a standard when in the stop position for comparison with the unknown, means to move said magazine to bring said standards one at a time into adjacency with said first viewing area, means for moving said standards relative to said magazine when adjacent the viewing area to bring said standards one at a time into viewing position in said first viewing area, a second viewing area with an opaque platform also within said housing to support the unknown in this said area, this second viewing area being positioned adjacent the first viewing area, a baffle in said housing dividing these two viewing areas into two side-by-side regions, a white light source in said housing and extending substantially parallel with the plane assumed by the standards in the stop position for comparison with the unknown, and ultra-violet light source in said housing for illuminating the other of said regions and also extending substantially parallel with the aforesaid planes, and the said housing having an aperture adjacent the platform in said second viewing area to permit positioning of the unknown, and a viewing aperture in said housing above this material introduction aperture through which these two areas may be viewed simultaneously in making comparisons.

GORDON A. YALE.

References Cited in the file of this patent

UNITED STATES PATENTS

| Number | Name | Date |
|---|---|---|
| 649,877 | Rouse | May 15, 1900 |
| 926,939 | Guerrant | July 6, 1909 |
| 1,031,857 | Lippincott | July 9, 1912 |
| 1,629,609 | Bader | May 24, 1927 |
| 2,502,014 | Loggie | Mar. 28, 1950 |